United States Patent
Van Den Enden et al.

(10) Patent No.: US 6,408,035 B1
(45) Date of Patent: Jun. 18, 2002

(54) SIMPLIFIED RECEIVER FOR FREQUENCY SHIFT KEYED SIGNALS

(75) Inventors: Adrianus W. M. Van Den Enden, Eindhoven (NL); Rutgerus E. E. F. Suermondt, Tau (NO)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/294,862

(22) Filed: Apr. 20, 1999

(30) Foreign Application Priority Data

Apr. 28, 1998 (EP) ............................................. 98201371

(51) Int. Cl.[7] ................................................. H04L 27/14

(52) U.S. Cl. ........................................ 375/334; 329/302

(58) Field of Search ................................ 375/272, 275, 375/334, 335; 329/300, 302

(56) References Cited

U.S. PATENT DOCUMENTS

| | | | |
|---|---|---|---|
| 4,475,219 A | 10/1984 | Puckette | 375/82 |
| 5,155,446 A | 10/1992 | Eberle et al. | 329/300 |
| 5,444,415 A * | 8/1995 | Dent et al. | 329/302 |
| 5,536,590 A | 7/1996 | Cheiky | 429/7 |

FOREIGN PATENT DOCUMENTS

| | | | | |
|---|---|---|---|---|
| GB | 2137836 A | 10/1984 | | H04L/27/14 |
| GB | 2308514 A | 6/1997 | | G06F/1/03 |

* cited by examiner

*Primary Examiner*—Amanda T. Le
(74) *Attorney, Agent, or Firm*—Jack D. Slobod

(57) ABSTRACT

In a receiver for FSK modulated signals, an input signal is applied to a converter (20) which mixes the input signal with a local oscillator frequency. The frequency of the local oscillator is unrelated to the frequencies of the FSK signal, resulting in a larger degree of freedom for choosing the local oscillator frequency. This oscillator frequency can e.g. be chosen to be one fourth of the sample frequency the input signal is sampled with.

7 Claims, 1 Drawing Sheet

SIMPLIFIED RECEIVER FOR FREQUENCY SHIFT KEYED SIGNALS

The present invention relates to a receiver for receiving frequency shift keyed signals comprising a converter for sampling an input signal and mixing it with a signal having a frequency related to the sample frequency to obtain an intermediate signal, the receiver further comprises a detector for deriving a detected signal from the intermediate signal.

The present invention relates also to a telephone terminal using such a receiver and to a receiving method.

BACKGROUND OF THE INVENTION

A receiver according to the preamble is known from U.S. Pat. No. 5,536,590. Such receivers find widespread use in all kind of equipment such as modems and telephone terminals.

In present day analog telephone systems, it is often required to send digital information from a telephone exchange to a subscriber. Examples of this digital information are e.g. Caller Identification information and information to be displayed on the screen of a screenphone. In the latter case, the digital information is transmitted according to the so-called ADSI standard (Advanced Digital Signaling Interface).

In order to be able to transmit digital information over the analog telephone network, Frequency Shift Keying (FSK) is used, in which the state of the digital signal is represented by a corresponding frequency. In telephone systems often binary FSK is used in which frequencies of 1200 and 2200 Hz represent the digital symbols.

In the known receiver for these FSK signals, the audio signal is sampled and subsequently mixed with a local oscillator which lies midway between the two frequencies of 1200 and 2200 Hz to obtain an intermediate signal. From the intermediate signal the detected signal is derived.

In order to simplify the receiver often there is a relation between the local oscillator frequency and the sample frequency, making it possible that the mixer arranged for mixing the local oscillator signal and the input signal is implemented digitally.

In the receiver known from the above mentioned US patent, the local oscillator frequency has a value of 1700 Hz. Because the sample frequency must be related to the local oscillator frequency, it has to be a multiple of 1700 Hz. In the known receiver this sampling frequency is 6800 Hz.

Often in telephone system the sample rate of the audio signals has to be at least equal to 8000 Hz to meet the requirements imposed by the sampling theorem, but preferably it is not chosen much larger in order to limit the complexity of the system. Due to the different sampling rates required in the system a sample rate converter would be required in order to derive a signal with a sample frequency of 6800 Hz from a signal with a sampling rate of 8000 Hz. This additional sample rate converter increases the complexity of the receiver substantially.

BRIEF SUMMARY OF THE INVENTION

The object of the present invention is to provide a receiver according to the preamble having a reduced implementation complexity.

To achieve said purpose the receiver according to the present invention is characterized in that the frequency of the signal with which the input signal is mixed is unrelated to the frequencies corresponding to a logical state of the frequency shift keyed signal.

The present invention is based on the recognition that is not necessary that the frequency with which the input signal is mixed with, is the average of the frequencies corresponding to the different states of the frequency shift keyed signal. This recognition goes against the teaching according to a plurality of prior art documents. Besides the above mentioned US patent application the same teaching is disclosed e.g. in U.S. Pat. Nos. 4,475,219, 5,155,446 and UK Patent application No. 2 137 836. This recognition enables that the frequency with which the input signal is mixed is chosen independently from the frequencies representing the states of the FSK modulated signal.

An embodiment of the invention is characterized in that the converter is arranged for providing quadrature related signals representing the intermediate signals.

Using quadrature signals for representing the intermediate signal, it becomes very easy to determine the current phase of the intermediate signal. This facilitates an easy implementation of the detector for deriving a detected signal from the intermediate signal.

A further embodiment of the invention is characterized in that the frequency of the signal with which the input signal is mixed is equal to one fourth of the sample frequency of the intermediate signal.

This choice of the relation between sample frequency and frequency with which the input signal is mixed can lead to a substantially simplified convertor.

A further embodiment of the invention is characterized in that the convertor is arranged for deriving a first quadrature signal by multiplying the input signal cyclically with values proportional to +1,0,−1,0 and in that the converter is arranged for deriving a second quadrature signal by multiplying the input signal cyclically with values proportional to 0,+1,0,−1.

This embodiment leads to a very simple converter which does not require a multiplier for mixing the input signal. The quadrature signals can be obtained by performing at four subsequent sample instants the following operations. At the first sample instant, a sample of the input signal is passed unaltered to the output carrying the first quadrature signal, and the value 0 is passed to the output carrying the second quadrature signal. At the second sample instant, the value 0 is passed to the output carrying the first quadrature signal, and a sample of the input signal is passed unaltered to the output carrying the second quadrature signal. At the third sample instant, the inverted value of a sample of the input signal is passed to the output carrying the first quadrature signal, and value 0 is passed to the output carrying the second quadrature signal. At the fourth sample instant, the value 0 is passed to the output carrying the first quadrature signal, and the inverted value of a sample of the input signal is passed to the output carrying the second quadrature signal.

A further embodiment of the invention is characterized in that the detector comprises a phase detector for determining an approximation of the phase of the signal represented by the in-phase signal and the quadradure signal, and in that the detector comprises difference determining means for determining the change of said approximation of the phase as function of time.

By determining an approximation of the phase signal instead of the exact value of the phase the detector can be simplified. The logical state represented by the input signal can be easily determined from the difference between approximated phase values at different sample instants.

BRIEF DESCRIPTION OF THE DRAWINGS

The invention will now be explained with reference to the drawings.

DETAILED DESCRIPTION OF THE INVENTION

Figure 1:
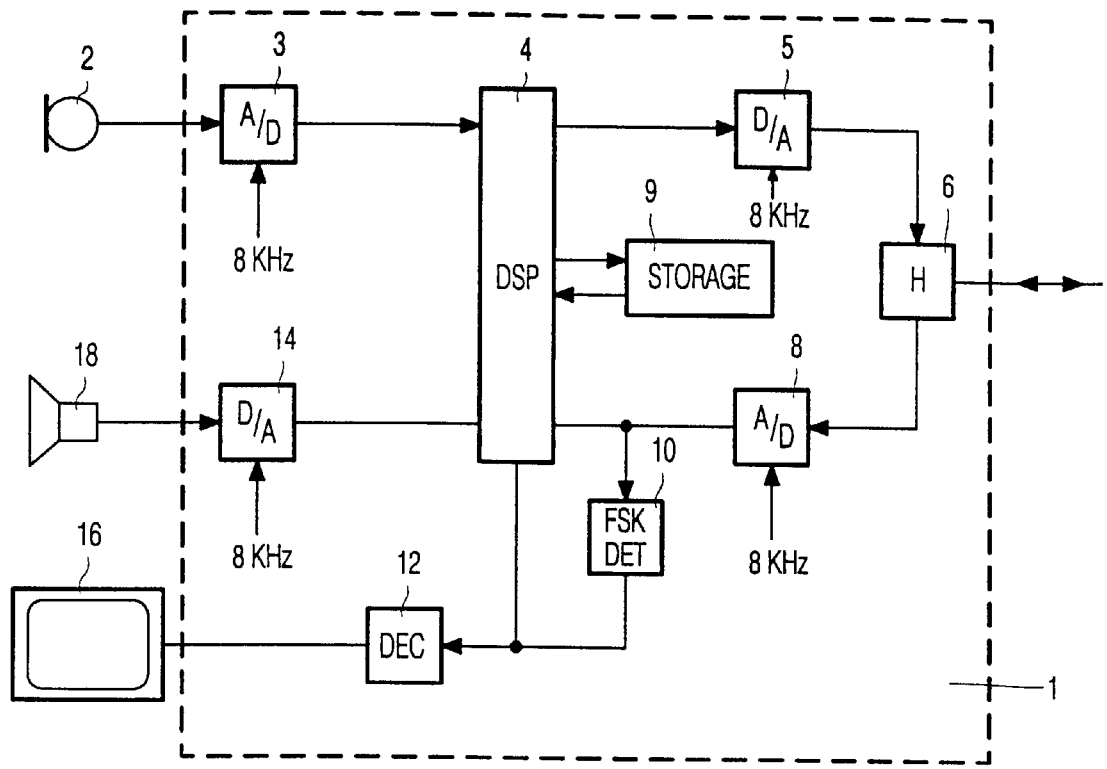
FIG. 1 shows a block diagram of a telephone terminal in which the invention can be applied.

In the telephone terminal according to FIG. 1, a microphone 2 is connected to an input of an analog to digital converter 3. The analog to digital converter 3 amplifies the signal from the microphone 3, samples it with a sample frequency of 8 kHz and converts it into a digital signal. The output of the analog to digital converter 3 is connected to a first input of a digital signal processor 4.

A first output of the digital signal processor 4 is connected to a digital to analog converter 5 which converts the digital signal provided by the digital signal processor into an analog signal. The analog signal at the output of the digital to analog converter 5 is applied to an input of a hybrid 6 for transmission via a telephone network.

A combined input/output of the hybrid 6 is coupled to the telephone line which connects the terminal to the telephone network.

An output of the hybrid 6, carrying an analog signal received from the telephone network is connected to an analog to digital converter 8. The analog to digital converter 8 samples the signal from the hybrid 6 with a sample frequency of 8 kHz and converts it into a digital signal. The output of the analog to digital converter 8 is connected to an input of the digital signal processor 4.

A second output of the digital signal processor 4 is connected to a digital to analog converter 14 which converts the signal received from the second output of the digital signal processor 4 into an analog signal which is suitable for a loudspeaker 18.

The digital signal processor 4 is present to perform several additional functions in the telephone terminal. A first additional function is a built in digital telephone answering machine. The digital signal processor 4 is arranged for encoding the speech signal from the microphone 2 and storing it on a storage device 9, in order to enable a user to record a welcome message. The encoding of the speech signal is performed in order to minimize the required storage capacity of the storage device 9. Methods for encoding speech signals are well known to those skilled in the art. If the telephone terminal automatically answers a call, this welcome message is retrieved from the storage device 9, decoded by the digital signal processor 4 and applied to the digital to analog converter 5 for transmission to the telephone network.

The digital signal processor 4 is also arranged for encoding the digital speech signal received from the analog to digital converter 8 and storing the encoded speech signal on the recording device 9 when the terminal is in automatic answering mode and a speech signal is present at the output of the analog to digital converter 8. For playing back the encoded speech signal stored on the recording device 9, this encoded speech signal is decoded by the digital signal processor 4 and passed to the digital to analog converter 14 for conversion into a signal for the loudspeaker 18.

The digital signal processor 4 can also be used for providing acoustic echo cancellation for enabling hands free operation of the telephone terminal. In case of hands free operation, the microphone will receive an echo signal from the loudspeaker 18. This echo signal will be transmitted to the far end where a user hears a delayed version of its own speech signal. This effect is quite annoying and deteriorates the quality of the communication substantially.

To prevent this effect, the digital signal processor 4 filters the digital signal received from the analog to digital converter 8 with a transfer function substantially equal to the transfer function of the acoustical path from the loudspeaker 18 to the microphone 2. This filtered signal is subtracted from the output signal of the analog to digital converter 3, resulting in a signal which is substantially free of echoes.

The output of the analog to digital converter is also connected to an FSK demodulator 10 which demodulates an FSK signal received from the output of the analog to digital converter 8. An output of the FSK demodulator 10 is connected to a decoder 12 and to a control input of the digital signal processor 4. The output signal of the FSK modulator can e.g. be used for controlling the digital signal processor 4 for applications such as remote listening to the information recorded by the telephone answering machine function.

The output signal of the FSK demodulator 10 can also comprise caller ID information. In this case the caller ID information is decoded by a decoder 12 and is displayed on a screen 16. The FSK signal can also carry more advanced graphical information according to the above mentioned ADSI standard.

It is observed that in FIG. 1 the digital signal processor 4, the FSK demodulator 10 and the decoder 12 are separate components. It is however possible that the function of the FSK demodulator 10 and the decoder 12 is also performed by the digital signal processor 4.

Figure 2:
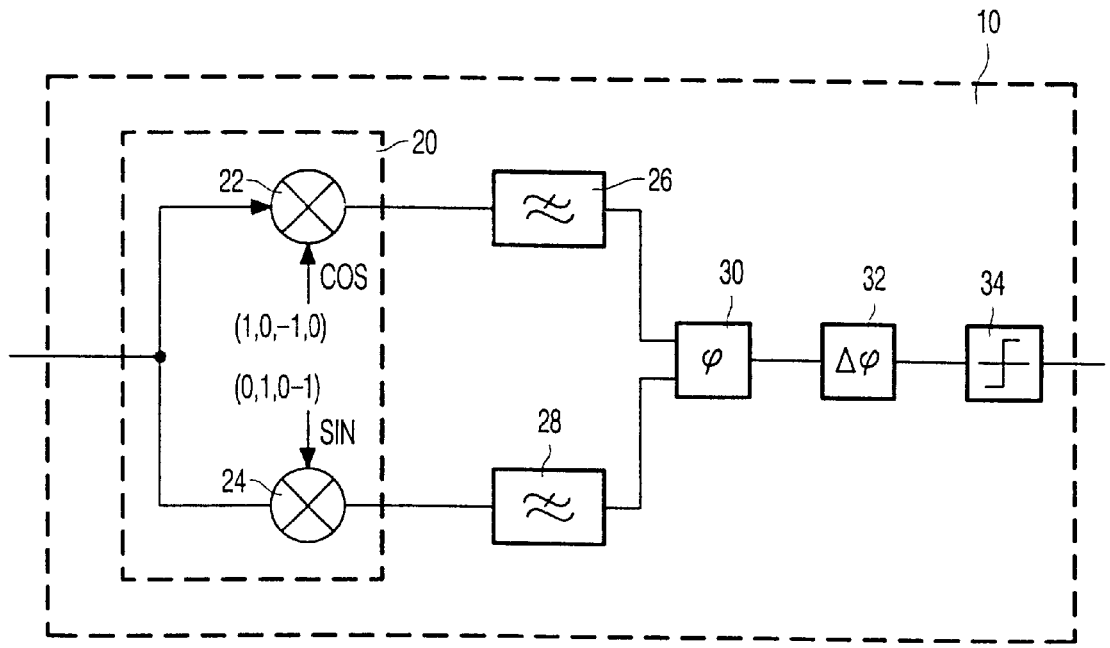
FIG. 2 shows a block diagram of an FSK demodulator according to the invention.

In the FSK demodulator 10 according to FIG. 2, the input signal is applied to a converter 20. In the converter 20 the input signal is applied to a first input of a first mixer 22 and to a first input of a second mixer 24. To a second input of the first mixer a cosine like signal with a frequency of 2 kHz is applied and to a second input of the second mixer a sine like signal with a frequency of 2 kHz is applied.

Instead of using the mixers 22 and 24, the conversion means can also be realized by making the input signal $V_{in}$ and its inverse $-V_{in}$ available and using a selector for passing appropriate signals to the quadrature branches. It is possible to obtain a mixing operation with a frequency equal to one fourth of the sample frequency by periodically passing the input signal and the inverted input signal to the two branches according to the table below:

| instant | in-phase branch (cosine) | quadrature branch (sine) |
|---|---|---|
| 4 · n · T | $V_{in}$ | 0 |
| 4 · n · T + 1 | 0 | $V_{in}$ |
| 4 · n · T + 2 | $-V_{in}$ | 0 |
| 4 · n · T + 3 | 0 | $-V_{in}$ |

This method can be applied without using any multiplier making its implementation quite simple.

It is assumed that the frequencies of the FSK signal can be 1200 Hz and 2200 Hz. Consequently the output signal of the mixers 22 and 24 comprise frequency components of +800 Hz and −200 Hz. In the case the frequencies of the FSK signal are 1300 Hz and 2100 Hz, the output signal of the mixers 22 and 24 comprise frequency components of +700 Hz and −100 Hz.

The filters 26 and 28 are present to suppress the sum components which arise due to the mixing of the input signal with the 2 kHz signal. If the frequencies of the FSK signal are 1200 Hz and 2200 Hz, the frequencies of the sum components are 3200 Hz and −3800 Hz. If the frequencies of the FSK signal are 1300 Hz and 2100 Hz, the frequencies of the sum components are 3300 Hz and −3900 Hz. In both cases these (undesired) sum components can be sufficiently suppressed by using a very simple filter having only two equal coefficients. This filter can be implemented by adding two subsequent samples s(n) and s(n−1).

At the output of the filters 26 and 28 the in-phase and quadrature signals are available. These quadrature signals represent a complex signal $V_1$. The in-phase signal is equal to the real part $\Re e(V_1)$ of $V_1$ and the quadrature signal is the imaginary part $\Im m(V_1)$ of $V_1$.

These quadrature signals are applied to corresponding inputs of a phase detector 30. The phase detector 30 determines the actual phase from the signal represented by the quadrature components at its input.

The determination of the phase can be done by performing an arctan function on the quadrature components, but preferably simpler methods are used.

A first way is to determine an approximation of the phase from the real part $\Re e(V_1)$ and the imaginary part $\Im m(V_1)$ by determining the quadrant corresponding to the phase. This can be done according to the following table:

| Condition | Quadrant |
|---|---|
| $\Re e(V_I) \geq 0$ and $\Im m(V_I) \geq 0$ | 1 |
| $\Re e(V_I) < 0$ and $\Im m(V_I) \geq 0$ | 2 |
| $\Re e(V_I) < 0$ and $\Im m(V_I) < 0$ | 3 |
| $\Re e(V_I) \geq 0$ and $\Im m(V_I) < 0$ | 4 |

It is also possible to divide the unit circle in 8 sectors numbered 1 to 8, which corresponds to quantizing the phase with an accuracy of $\pi/4$. The sector number of a given input signal can be determined according to the following table:

| Condition | Sector |
|---|---|
| $\Re e(V_I) \geq$ and $\Im m(V_I) \geq 0$ and $\|\Re e(V_I)\| \geq \|\Im m(V_I)\|$ | 1 |
| $\Re e(V_I) \geq$ and $\Im m(V_I) \geq 0$ and $\|\Re e(V_I)\| < \|\Im m(V_I)\|$ | 2 |
| $\Re e(V_I) <$ and $\Im m(V_I) \geq 0$ and $\|\Re e(V_I)\| < \|\Im m(V_I)\|$ | 3 |
| $\Re e(V_I) <$ and $\Im m(V_I) \geq 0$ and $\|\Re e(V_I)\| \geq \|\Im m(V_I)\|$ | 4 |
| $\Re e(V_I) <$ and $\Im m(V_I) < 0$ and $\|\Re e(V_I)\| \geq \|\Im m(V_I)\|$ | 5 |
| $\Re e(V_I) <$ and $\Im m(V_I) < 0$ and $\|\Re e(V_I)\| < \|\Im m(V_I)\|$ | 6 |
| $\Re e(V_I) \geq$ and $\Im m(V_I) < 0$ and $\|\Re e(V_I)\| < \|\Im m(V_I)\|$ | 7 |
| $\Re e(V_I) \geq$ and $\Im m(V_I) < 0$ and $\|\Re e(V_I)\| \geq \|\Im m(V_I)\|$ | 8 |

The phase detector 30 presents at its output a signal representing the quadrant or the sector of the phase. This signal indicates a quadrant number 1,2,3 or 4, or it indicates a sector number 1, 2, 3, 4, 5, 6, 7, or 8. The output of the phase detector is connected to a phase difference calculator 32. This phase difference calculator 32 calculates the difference between the phase values represented by the quadrant number or sector number corresponding to two subsequent sample instants. Because the frequency of the output signal of the conversion means can be +800 Hz and −200 Hz, the maximum value of the phase shift over one sample period is $\pi/2$. This means ththe phase shift difference can never be more than one quadrant or two sectors. Consequently it is assumed that a change from a first phase value at a first sample instant to a second phase value at a second sample instant is caused by a rotation over the smallest possible angle. If the phase value is represented by the quadrant number, the phase difference can be calculated according to $$\Delta\phi = \phi_2 - \phi_1; |\phi_2 - \phi_1| \leq 2$$
$$\Delta\phi = (4 - |\phi_2 - \phi_1|) \cdot \text{sgn}(\phi_1 - \phi_2); |\phi_2 - \phi_1| > 2 \quad (A)$$

In (1) $\phi_1$ is the phase angle at a first sample instant and $\phi_2$ is the phase at a second sample instant. $\text{sgn}(\phi_{1-2})$ is the sign of $(\phi_1 - \phi_2)$.

If the phase value is represented by the sector number which can have a value from 1 to 8, for the phase difference can be found:

$$\Delta\phi = \phi_2 - \phi_1; |\phi_2 - \phi_1| \leq 4$$
$$\Delta\phi = (8 - |\phi_2 - \phi_1|) \cdot \text{sgn}(\phi_1 - \phi_2); |\phi_2 - \phi_1| > 4 \quad (B)$$

The phase difference is averaged over a few sample periods, e.g. 5 and is passed to a comparator 34. The comparator 34 is arranged for comparing the output signal of the a phase difference calculator 32 with a threshold value, in order to make a distinction between the two frequencies of the FSK modulated signals.

Because the output signal of the mixer 22 comprises samples with value 0 every other one, it is easily possible to decrease the sampling rate at the output of the converter 20. This can be done directly at the output of the converter 20, but it is also possible to perform the downsampling operation after the filters 26 and 28. The advantage of a decreased sampling rate is a reduction of the required processing speed of the phase detector 30 and the phase difference calculator 32. However it should be ensured that aliasing is prevented by increasing the steepness of the filters 26 and 28.

It is observed that if short FSK signals should be detected, it is preferred not to downsample the signals in the FSK demodulator, because otherwise the number of samples available for detection the FSK signal may be too low.

What is claimed is:

1. Receiver for receiving frequency shift keyed signals comprising a converter for sampling an input signal and mixing it with a signal having a frequency related to the sample frequency to obtain an intermediate signal, the receiver further comprises a detector for deriving a detected signal from the intermediate signal, characterized in that the frequency of the signal with which the input signal is mixed is unrelated to the frequencies corresponding to a logical state of the frequency shift keyed signal.

2. Receiver according to claim 1, characterized in that the converter is arranged for providing quadrature related signals representing the intermediate signals.

3. Receiver according to claim 2, characterized in that the frequency of the signal with which the input signal is mixed is equal to one fourth of the sample frequency of the intermediate signal.

4. Receiver according to claim 3, characterized in that the convertor is arranged for deriving a first quadrature signal by multiplying the input signal cyclically with values proportional to +1,0,−1,0 and in that the converter is arranged for deriving a second quadrature signal by multiplying the input signal cyclically with values proportional to 0,+1,0,−1.

5. Receiver according to claim 1, characterized in that the detector comprises a phase detector for determining an approximation of the phase of the signal represented by the in-phase signal and the quadradure signal, and in that the detector comprises difference determining means for determining the change of said approximation of the phase as function of time.

6. Telehone terminal comprising the receiver according to claim 1.

7. The receiver of claim 1, wherein the frequency shift keyed signals all lie within a single frequency channel.

* * * * *